United States Patent
Maekawa et al.

(10) Patent No.: US 6,299,175 B1
(45) Date of Patent: Oct. 9, 2001

(54) METAL GASKET

(75) Inventors: Hisato Maekawa; Kazuhiko Yamato; Reizi Mahigashi; Yoshitaka Abe, all of Toyonaka (JP)

(73) Assignee: Kokusan Parts Industry Co., Ltd., Toyonaka (JP)

( * ) Notice: Subject to any disclaimer, the term of this patent is extended or adjusted under 35 U.S.C. 154(b) by 472 days.

(21) Appl. No.: 09/163,013

(22) Filed: Sep. 30, 1998

Related U.S. Application Data

(63) Continuation-in-part of application No. 08/887,281, filed on Jul. 2, 1997, now abandoned, which is a continuation of application No. 08/698,312, filed on Aug. 15, 1996, now abandoned, which is a division of application No. 08/403,952, filed on Mar. 14, 1995, now abandoned.

(30) Foreign Application Priority Data

Mar. 15, 1994 (JP) .................................... 6-043993

(51) Int. Cl.⁷ .......................................... F02F 11/00
(52) U.S. Cl. ............................. 277/593; 277/595
(58) Field of Search ..................... 277/593, 594, 277/595

(56) References Cited

U.S. PATENT DOCUMENTS

| | | |
|---|---|---|
| 3,794,333 * | 2/1974 | Czernik et al. ............... 277/180 |
| 4,178,983 | 12/1979 | Mochizuki et al. . |
| 4,265,679 | 5/1981 | Ohashi et al. . |
| 4,836,562 | 6/1989 | Yoshino . |
| 5,240,261 | 8/1993 | Udagawa et al. . |
| 5,286,039 | 2/1994 | Kawaguchi et al. . |
| 5,348,315 | 9/1994 | Kawaguchi et al. . |
| 5,431,418 | 7/1995 | Hagiwara et al. . |

* cited by examiner

*Primary Examiner*—Daniel G. DePumpo
(74) *Attorney, Agent, or Firm*—Armstrong, Westerman, Hattori, McLeland & Naughton, LLP

(57) ABSTRACT

A metal gasket for use between heads and blocks of an internal combustion engine in which such gasket is composed of a beaded plate and a stopper plate placed one on top of the other. The metal gasket has an opening corresponding to the cylinder hold of the engine. The metal gasket has an annular stopper formed by folding back the periphery of the opening in the stopper plate. The metal gasket also has a stepped part along the outer periphery of the stopper. This stepped part projects toward the side of the gasket on which the stopper is formed. The metal gasket also has a spacer layer formed between the stopper and an annular pressure receiver of the stopper plate. The metal gasket also has a rubber coating layer formed at least on that side of the stopper plate opposite to the side on which the stopper is formed.

5 Claims, 7 Drawing Sheets

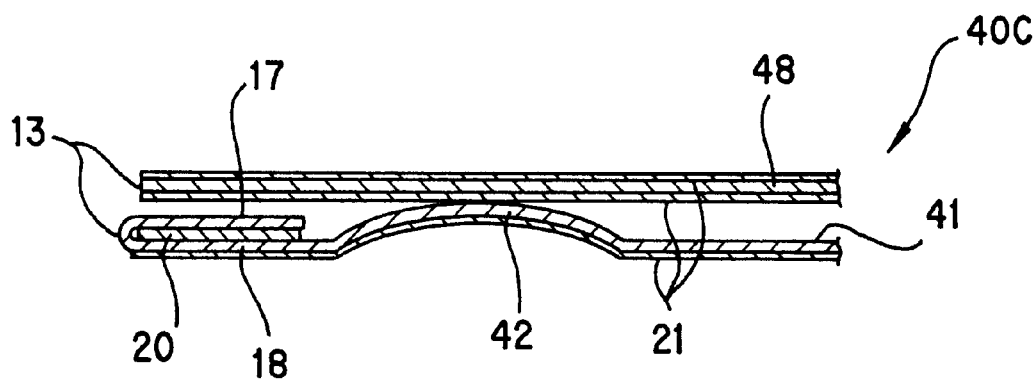
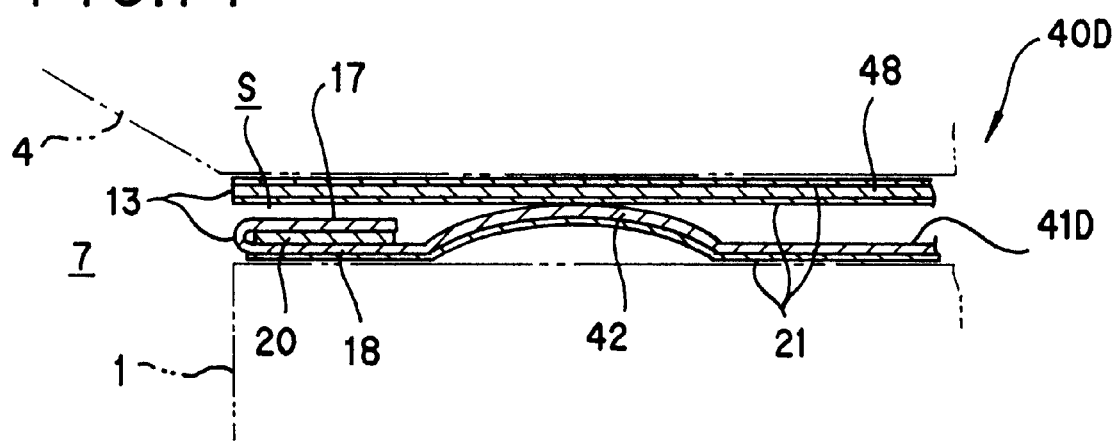
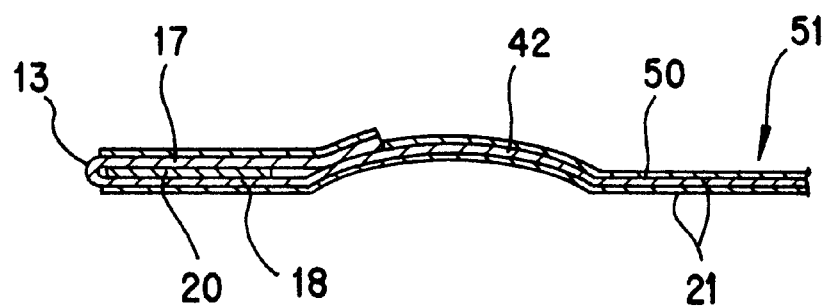

METAL GASKET

This application is a continuation in part of prior application Ser. No. 08/887,281 filed Jul. 2, 1997 now abandoned, which is a continuation of application Ser. No. 08/698,312, filed Aug. 15, 1996, now abandoned which is a divisional of application Ser. No. 08/403,952, filed Mar. 14, 1995 now abandoned.

BACKGROUND OF THE INVENTION

1. Field of the Invention

The present invention relates to a metal gasket to be installed between the cylinder block and cylinder head of an engine.

2. Description of the Prior Art

It is common practice to install a metal gasket between the cylinder block and cylinder head of an engine to hermetically seal the combustion chamber.

As shown in attached reference FIG. 16, a metal gasket is sandwiched between a cylinder head and a cylinder block of an engine. Movement in the engine, chiefly in the transverse direction, imposes a large lateral stress onto a periphery of a folding part of a stopper so that a crack is often generated thereon. In practice, a. cylinder block is constructed from cast iron and a cylinder head is made from an aluminum alloy. However, the coefficients of thermal expansion of both materials differ significantly. As a result, movement of an annular pressure receiver attached to the cylinder block differs from that of a stopper attached to the cylinder head so that a large stress occurs on the periphery of the folding part during a temperature change of the engine. Particularly if the metal gasket consists of only a first gasket-constituting plate, the abovementioned difference is amplified and the stress acting on the periphery of the folding part is amplified.

The metal gasket for this purpose is usually constructed as follows: It is composed of a beaded plate (which is an elastic metal plate) and a stopper plate placed on top of the other. The beaded plate and stopper plate each has openings at the positions corresponding to the cylinder holes of the engine. The beaded plate has an annular bead (bulging toward the stopper plate) formed in the vicinity of the periphery of the opening. The stopper plate has a stopper (folded back toward the beaded plate) formed in the vicinity of the periphery of the opening. Thus, when the cylinder head is fixed to the cylinder block by means of a plurality of cylinder head tightening bolts, the stopper forms a space equal to its thickness in the vicinity of the bead so as to prevent the bead from being anomalously deformed.

It is also known that the beaded plate and stopper plate are provided with a coating layer of rubber (such as NBR rubber and fluororubber) so as to improve the metal gasket in sealing performance.

The above-mentioned metal gasket poses a problem associated with deformation. That is, the stopper formed on the stopper plate deforms the stopper plate surrounding the stopper convexly toward that side on which the stopper is formed. Likewise, the bead formed on the beaded plate deforms the beaded plate surrounding the bead convexly in the direction in which the bead bulges.

This deformation leads to an uneven rubber coating layer on the stopper plate and beaded plate, and the uneven coating layer results in poor sealing. In addition, the deformed stopper plate and beaded plate do not fit well to each other, resulting in the metal gasket deforming as a whole. Thus the deformed metal gasket is not snugly inserted between the cylinder block and cylinder head.

SUMMARY OF THE INVENTION

It is an object of the present invention to provide a new metal gasket composed of a single plate or multiple plates which are almost free from warpage. The metal gasket composed of multiple plates is easy to assemble and install in the engine. The metal gasket composed of a single plate is easy to install in the engine.

The present invention is embodied in a metal gasket composed of an elastic metal plate, characterized in that the elastic metal plate has an opening corresponding to the cylinder hole of the engine, an annular stopper formed by folding back the periphery of the opening, and a stepped part formed along the outer periphery of the stopper, said stepped part projecting toward the side on which the stopper is formed.

According to a preferred embodiment, the metal gasket may have an annular bead (bulging toward the side on which the stopper is formed) formed along the outer periphery of the stopper on the gasket-constituting plate and a stepped part formed at the inner periphery of the bead.

According to a preferred embodiment, the gasket-constituting plate is one which is formed from precipitation hardened high-silicon duplex stainless steel by fabrication into a desired shape and age hardening, said stainless steel being composed of 0.05% and less carbon, 3–6% silicon, 5% and less manganese, 5–10% nickel, 6–12% (excluding 12%) chromium, 0.2–1% molybdenum, and 0.5–3% copper, with the remainder being iron (by weight).

According to a preferred embodiment, the gasket-constituting plate has a coating layer formed at least on the side opposite to that on which the stopper is formed.

According to a preferred embodiment, the gasket-constituting plate has a raised spacer layer formed by pattern printing with a heat-resistant, compression-resistant material, between the stopper and that part of the gasket-constituting plate which is opposite to the stopper.

According to a preferred embodiment, the metal gasket is composed of at least two kinds of gasket-constituting plates, one having a stopper formed thereon and the other having no stopper formed thereon, which are arranged such that the inner periphery of the folded part of the stopper of the former is inside the inner periphery of the opening of the latter.

According to a preferred embodiment, the metal gasket is composed of at least two kinds of gasket-constituting plates, one having a stopper formed thereon and the other having no stopper formed thereon, with the inner periphery of the folded part of the stopper of the former being of the same radius as that of the inner periphery of the opening of the latter.

BRIEF DESCRIPTION OF THE DRAWINGS

FIG. 13 is a diagram equivalent to FIG. 4 showing a gasket of another construction.

FIG. 14 is a diagram equivalent to FIG. 4 showing a gasket of another construction.

FIG. 15 is a diagram equivalent to FIG. 4 showing a gasket of another construction.

DESCRIPTION OF THE PREFERRED EMBODIMENTS

Figure 1:
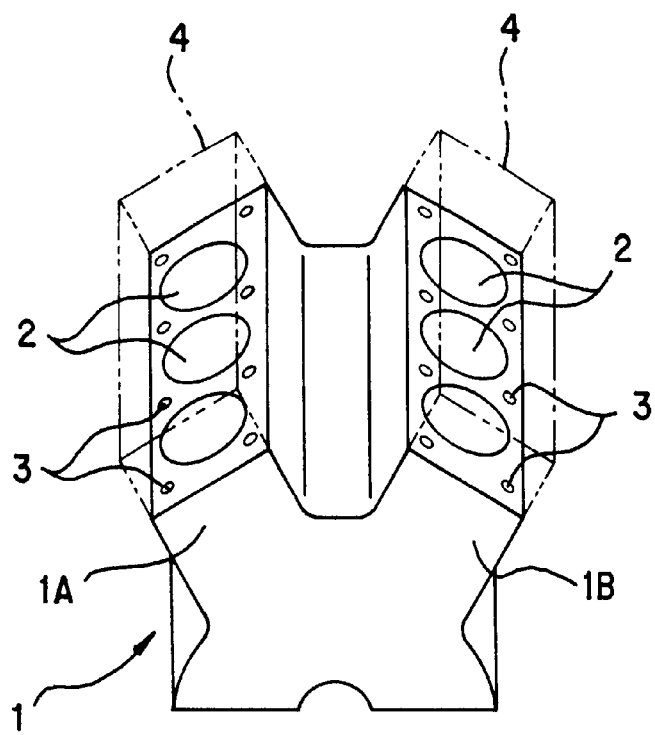
FIG. 1 is a perspective view of a cylinder block.

The metal gasket of the present invention is constructed of a gasket-constituting plate and a beaded plate placed on top of the other. The gasket-constituting plate has an opening corresponding to the cylinder hole, and the periphery of the opening has an annular stopper formed by folding back. The outer periphery of the stopper has a stepped part formed along it which projects toward the side on which the stopper is formed. This construction offers the advantage of preventing the gasket-constituting plate from deformation. In other words, the stepped part formed along the outer periphery of the stopper prevents the gasket-constituting plate from deforming around the stopper convexly toward the side on which the stopper is formed because the stopper is formed of the gasket-constituting plate by folding back.

The metal gasket may be composed of a single gasket-constituting plate if the annular bead (bulging toward the side on which the stopper is formed) is formed along the outer periphery of the stopper of the gasket-constituting plate and the stepped part is formed at the inner periphery of the bead. The stepped part formed at the inner periphery of the bead effectively prevents the overall deformation of the gasket-constituting member which would otherwise be caused by the formation of the stopper.

The gasket-constituting plate may be formed from precipitation hardened high-silicon duplex stainless steel by fabrication into a desired shape and age hardening, said stainless steel being composed of 0.05% and less carbon, 3–6% silicon, 5% and Less manganese, 5–10% nickel, 6–12% (excluding 12%) chromium, 0.2–1% molybdenum, and 0.5–3% copper, with the remainder being iron (by weight). The gasket-constituting plate in this case can be very thin and yet has high toughness, high heat resistance, and good durability.

A rubber coating layer may be formed on that side of the gasket-constituting plate which is opposite to the side on which the stopper is formed. The rubber coating layer enhances the sealing performance of the metal gasket. This rubber coating layer may be uniform in thickness because the gasket-constituting plate is almost flat with very little deformation.

The metal gasket may have a spacer layer formed between the stopper and that part of the gasket-constituting plate which is opposite to the stopper. The spacer layer may be properly adjusted in thickness, so that it is possible to readily control the amount of deformation of the bead. For example, the spacer layer may be formed such that its thickness gradually decreases in approaching the cylinder head tightening bolt. In this case it is possible to keep the surface pressure uniform between the cylinder block and the stopper, to prevent the cylinder bore from deforming towerd its center near the top dead center, and to improve the sealing performance between the piston and the cylinder bore. In this case the spacer layer is held between the stopper and that part of the gasket-constituting plate which is opposite to the stopper. Therefore, the spacer layer is effectively protected from peeling. In addition, the folded part of the stopper has a small radius of curvature, so that the folded part is effectively protected from cracking.

The spacer layer preferably uses a material consisting mainly of an aluminum powder and an epoxy resin.

The gasket-constituting plate may have a raised spacer layer formed by pattern printing with a heat-resistant, compression-resistant material. The pattern printing makes it possible to adjust the thickness of the spacer layer, to form a plurality of spacer layers simultaneously, and to form the spacer layer only at a desired part.

In case of forming a spacer layer having a different thickness partially by pattern printing, pattern printing should be repeatedly performed on a specified part where a greater thickness is required.

The metal gasket may be composed of at least two kinds of gasket-constituting plates, one having a stopper formed thereon and the other having no stopper formed thereon, which are arranged such that the inner periphery of the folded part of the stopper of the former is inside the inner periphery of the opening of the latter. In this case a gap corresponding to the thickness of the gasket-constituting plate having no stopper is formed at the folded part of the stopper. This gap reduces the load exerted on the folded part and hence effectively protects the folded part from cracking.

The metal gasket may be composed of at least two kinds of gasket-constituting plates, one having a stopper formed thereon and the other having no stopper formed thereon, with the inner periphery of the folded part of the stopper of the former being of the same radius as that of the inner periphery of the opening of the latter. This constitution minimizes the space (communicating with the combustion chamber) between the cylinder head and the cylinder block, thereby reducing the amount of HC exhaust gas from the engine.

EXAMPLE

The example of the invention will be described with reference to the accompanying drawings.

This example demonstrates the metal gasket of the present invention which is installed between the cylinder head and the cylinder block of a V-6 engine.

Figure 2:
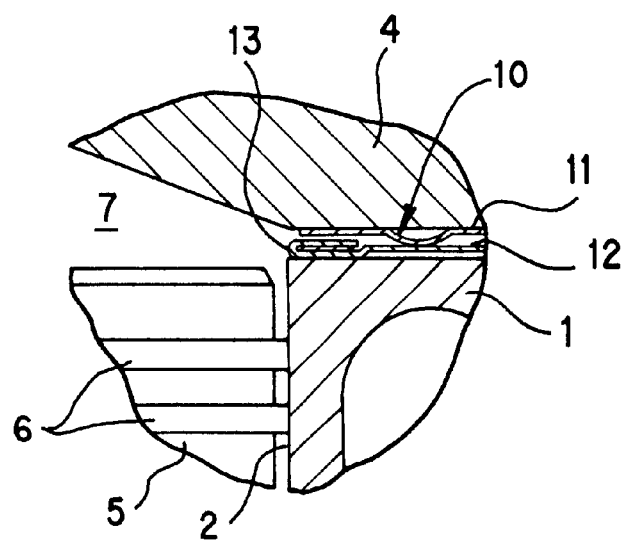
FIG. 2 is a vertical sectional view of an important part of an engine near the metal gasket.

As shown in FIGS. 1 and 2, the V-6 engine has a cylinder block 1 which is divided into the right and left banks 1A, 1B, each having three cylinder holes 2. There are eight bolt holes 3 on the top of the respective banks 1A, 1B. To the top of the respective banks 1A, 1B is fixed a cylinder head 4 by cylinder head tightening bolts (not shown). Between each of the right and left cylinder heads 4 and each of the right and left banks 1A, 1B of the cylinder block 1 is placed a metal gasket 10. In the cylinder hole 2 is hermetically and slidably fitted a piston 5, with a plurality of piston rings 6 inserted between. The metal gasket 10 and the piston rings 6 keep hermetic the combustion chamber 7 formed by the piston 5, cylinder block 1, and cylinder head 4.

Figure 3:
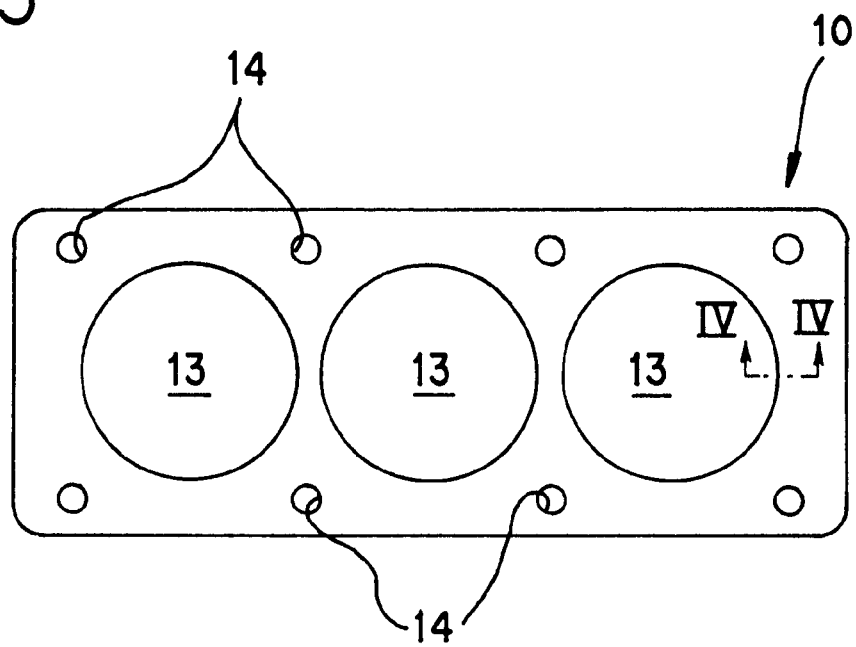
FIG. 3 is a plan view of an important part of the metal gasket.
Figure 4:
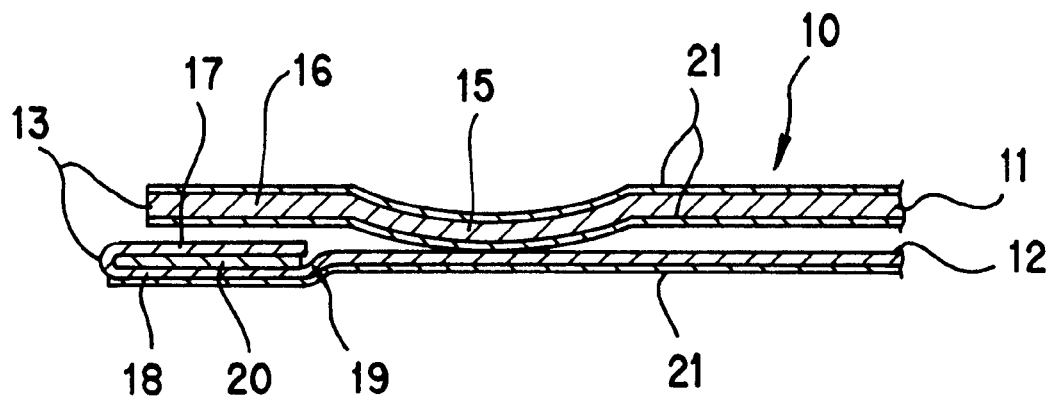
FIG. 4 is a sectional view taken along the line IV—IV in FIG. 3.

As shown in FIGS. 3 and 4, the metal gasket 10 is composed of a virtually flat beaded plate 11 and a stopper plate 12 (corresponding to the gasket-constituting plate), which are placed on top of the other. The former is an elastic metal plate of approximately the same size and shape as the upper surface of the cylinder block 1. The two plates are bonded to each other with rivets or eyelet holes (not shown) or by curling, mechanical clinching, or welding.

The beaded plate 11 and the stopper plate 12 have three openings 13 (corresponding to three cylinder holes 2) and eight bolt passing holes 14 (corresponding to eight bolt holes 3). In addition, they also have water passing holes and oil passing holes (not shown) that permit the passage of cooling water and lubricating oil through the cylinder block 1 and the cylinder head 4.

The beaded plate 11 has an annular bead 15 which bulges downward near the periphery adjacent to the opening 13. The annular bead 15 is formed such that it surrounds the upper edge of the cylinder hole 2. A flat extending part 16 is formed between the bead 15 and the periphery of the opening 13.

The stopper plate 12 has a stopper 17 which is formed by folding back the part close to the opening 13. The stopper 17 faces the annular extended part 16. The stopper 17 is backed by a flat annular pressure receiver 18. At the outer periphery of the annular pressure receiver 18 is formed an annular stepped part 19 which expands upward along the outer periphery of the stopper 17. Thus the stepped part 19 gives a difference in level to the stopper 17 and the annular pressure receiver 18. A spacer layer 20 is formed between the stopper 17 and the annular pressure receiver 18. A rubber coating layer 21 of NBR rubber or fluororubber is formed on the upper and lower sides of the beaded plate 11 and on the lower side of the stopper plate 12.

The spacer Layer 20 is formed such that it becomes thinner in approaching the bolt sassing hole 14. This is necessary so as to make even the surface pressure of the metal gasket 10 facing that part of the cylinder block 1 which is close to the cylinder hole 2. Alternatively, the spacer layer 20 may be formed only within a specific region most away from the bolt passing hole 14 so as to control the surface pressure. Or, the spacer layer 20 may be formed in uniform thickness over the entire periphery if it is to function merely as a spacer. Incidentally, this spacer layer 20 is not necessarily essential and may be omitted depending on circumstances.

The spacer layer 20 is formed from a heat-resistant, compression-resistant material, as if it is padded, on the upper surface of the annular pressure receiver 18 or on the surface of the stopper 17 which is placed on the annular pressure receiver 18. It is held between the stopper 17 and the annular pressure receiver 18 as the stopper 17 is folded back and placed on the annular pressure receiver 18.

The material for the spacer layer 20 includes natural resin, synthetic resin, synthetic rubbers, plastics filled with metal fine powder, and ceramic material. The spacer layer 20 may be formed by printing (such as letterpress printing, lithographic printing, intaglio printing, screen printing, flock printing, magnetic printing, and hot stamping) or by coating technology with a dispenser.

The stopper plate 12 is one which is formed from precipitation hardened high-silicon duplex stainless steel by fabrication into a desired shape and age hardening, said stainless steel being composed of 0.05% and less carbon, 3–6% silicon, 5% and less manganese, 5–10% nickel, 6–12% (excluding 12%) chromium, 0.2–1% molybdenum, and 0.5–3% copper, with the remainder being iron (by weight).

The stopper plate 12 formed from the material of specific composition as mentioned above has a surface hardness of 245–320 (in Vickers hardness Hv) and an elongation of 48% before age hardening. With these properties, the stopper plate 12 is capable of pressing and bending to form the opening 13, the bolt passing holes, the stepped part 19, and the stopper 17. After age hardening, the surface hardness increases to 490–680 (in Vickers hardness Hv). In addition, the age hardening can be accomplished at a comparatively low temperature (420–520° C.). Therefore, after fabrication, the stopper plate 12 has a high hardness and a high precision on account of a minimum of heat distortion.

The following data are given for the purpose of reference. The stopper plate 12 has a 0.2% proof stress of 101 kg/mm$^2$, a tensile strength of 116 kg/mm$^2$, an elongation of 48%, and a hardness of 320 Hv after solution treatment and also has a 0.2% proof stress of 125 kg/mm$^2$, a tensile strength of 178 kg/mm$^2$, an elongation of 20%, and a hardness of 580 Hv after precipitation hardening, if it is made of a material which is composed of 0.01% carbon, 4.0% silicon, 4.0% manganese, 6.0% nickel, 6.0% chromium, 0.3% molybdenum, 0.6% copper, with the remainder being iron.

The above-mentioned metal gasket 10 has the following functions. When the cylinder block 1 and the cylinder head 4 are tightened together by eight cylinder head fastening bolts, with the metal gasket 10 placed between them, the bead 15 is pressed against the stopper plate 12 so that the combustion chamber 7 is hermetically sealed. At the same time, a gap corresponding to the thickness of the stopper 17 is formed in the vicinity of the bead 15. This gap prevents the bead 15 from being anomalously deformed when the bolts are tightened.

Meanwhile, when the stopper 17 is formed by folding back the stopper plate 12, the stopper plate 12 tends to deform around the stopper 17 such that it bulges toward that side to which the stopper 17 is folded back. The deformation is prevented by the stepped part 19 formed at the outer periphery of the annular pressure receiver 18 facing the stopper 17. Therefore, the stopper plate 12 as a whole is kept flat. This facilitates the assembling of the beaded plate 11 and the stopper plate 12 and also minimizes the warpage of the metal gasket 10 as a whole. This in turn permits the metal gasket 10 to be readily installed in the engine. The stopper plate 12 with a minimum of deformation permits the rubber coating layer 21 to be formed with uniform thickness on its lower side.

In addition, since the spacer layer 20 is formed between the stopper 17 and the annular pressure receiver 18, it is possible to minimize the radius of curvature of the folded part of the stopper 17. This prevents the folded part from cracking. Moreover, the spacer layer 20 is surrounded by the stopper 17, the annular pressure receiver 18, and the stepped part 19, so that it is effectively protected from dropping.

The stopper plate 12 is fabricated such that the edge of its opening projects inward beyond the opening of the beaded plate 11. This effectively protects the folded part of the stopper 17 from cracking. Therefore, even in the case where the spacer layer 20 is omitted, the folded part is certainly protected from cracking.

The spacer layer 20 is formed such that it gradually decreases in thickness in approaching the bolt passing hole 14. This makes it possible to establish a uniform surface pressure for the metal gasket 10 in the vicinity of the cylinder hole 2 of the cylinder block 1. Therefore, it is possible to improve the sealing performance between the cylinder block 1 and the cylinder head 4, to prevent the deformation of the cylinder hole 2 near the top dead center, and to improve the sealing performance between the piston 5 and the cylinder hole 2. In addition, pattern printing makes it possible to properly adjust the thickness of the spacer layer 20, to form a plurality of spacer layers 20 simultaneously, and to form the spacer layer 20 only at a desired part.

The stopper plate 12 has a rubber coating layer 21 formed on its lower surface and the beaded plate 11 has a rubber coating layer 21 formed on both its upper and lower surfaces. This rubber coating layer improves the sealing performance between the cylinder block 1 and the cylinder head 4.

The stopper plate 12 made of a material of the above-mentioned composition has better mechanical properties than that which is made of an ordinary material such as SUS304 (specified in JIS). Therefore, the stopper plate 12 can be made thin (say, 0.05–0.1 mm) without the possibility of it suffering deformation and cracking. This contributes to the combustion efficiency of the engine.

The modification of the above-mentioned metal gasket 10 are explained below. The same members as those in the above example are given the same reference characters and their description is omitted.

Figure 5:
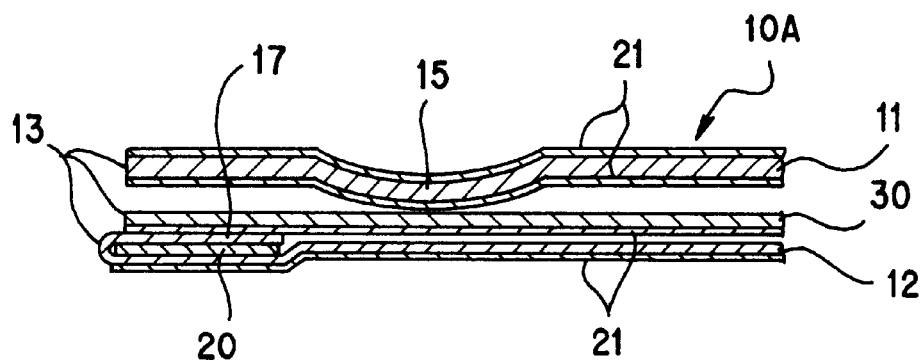
FIG. 5 is a diagram equivalent to FIG. 4 showing a gasket of another construction.
Figure 6:
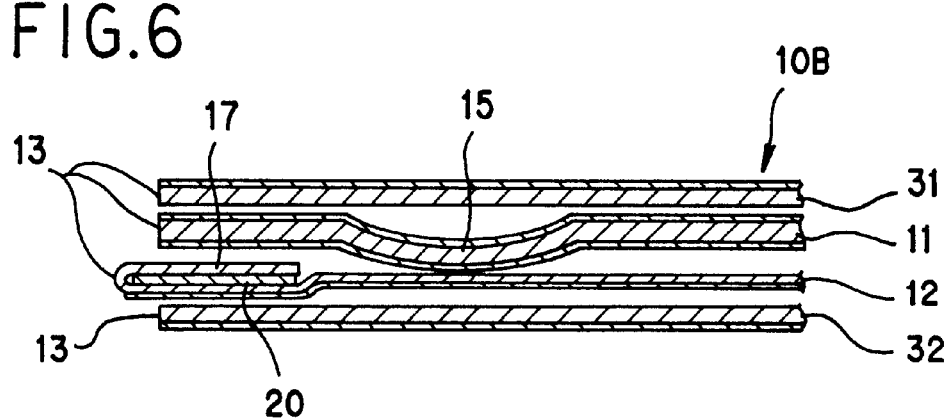
FIG. 6 is a diagram equivalent to FIG. 4 showing a gasket of another construction.
Figure 7:
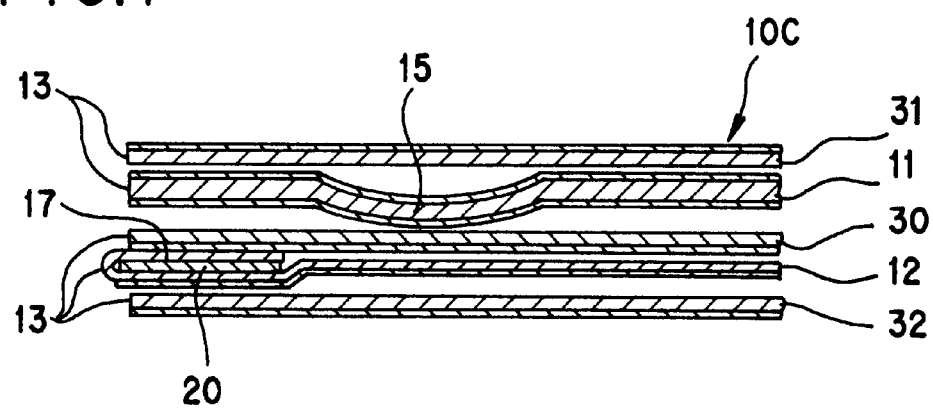
FIG. 7 is a diagram equivalent to FIG. 4 showing a gasket of another construction.
Figure 8:
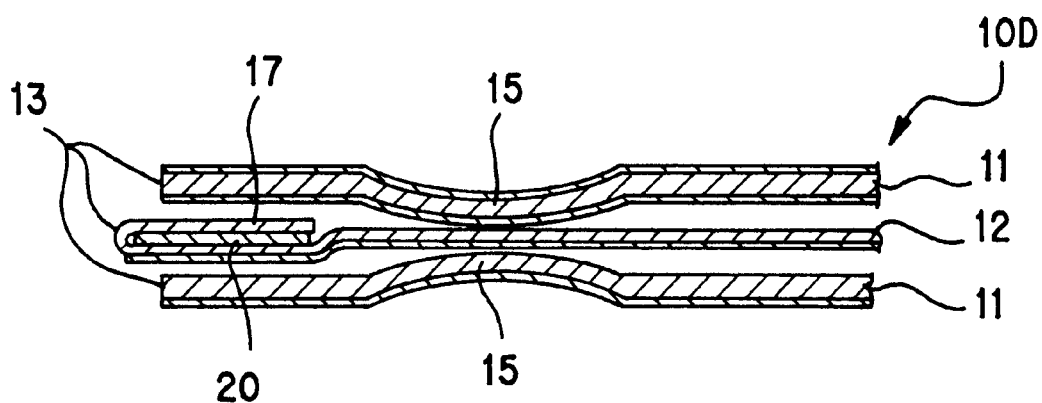
FIG. 8 is a diagram equivalent to FIG. 4 showing a gasket of another construction.
Figure 9:
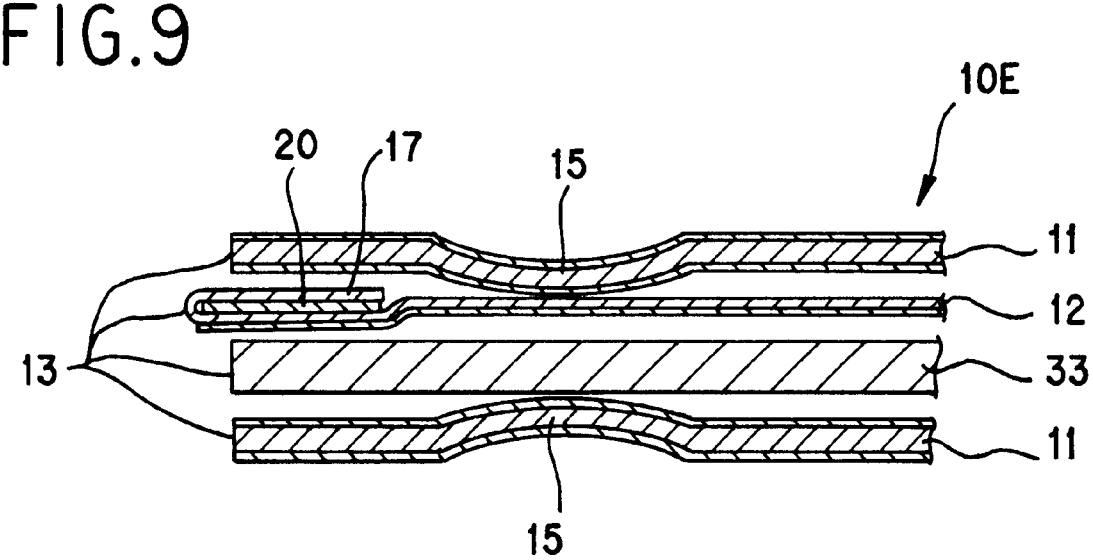
FIG. 9 is a diagram equivalent to FIG. 4 showing a gasket of another construction.

[1] A modified metal gasket 10A may have a supporting plate 30 between the beaded plate 11 and the stopper plate 12, as shown in FIG. 5. Another modified metal gasket 10B may have a supporting plate 31 on the upper side of the beaded plate 11 and a supporting plate 32 on the lower side of the stopper plate 12, as shown in FIG. 6. (In this case either of the supporting plates 31, 32 may be omitted.) Another modified metal gasket 10C may have a supporting plate 30 between the beaded plate 11 and the stopper plate 12, a supporting plate 31 on the upper side of the beaded plate 11, and a supporting plate 32 on the lower side of the stopper plate 12, as shown in FIG. 7. Another modified metal gasket 10D may have the beaded plates 11 on both upper and lower sides of the stopper plate 12 such that the bead 15 bulges toward the stopper plate 12, as shown in FIG. 8. Another modified metal gasket 10E may have the beaded plates 11 on both upper and lower sides of the stopper plate 12, with the bead 15 bulging toward the stopper plate 12, and a supporting plate 33 (which functions as a spacer) between the beaded plate 11 and the lower side of the stopper plate 12, as shown in FIG. 9. Incidentally, the beaded plate 11 and supporting plates 30–32 may be made of the same material as that of the stopper plate 12.

Figure 10:
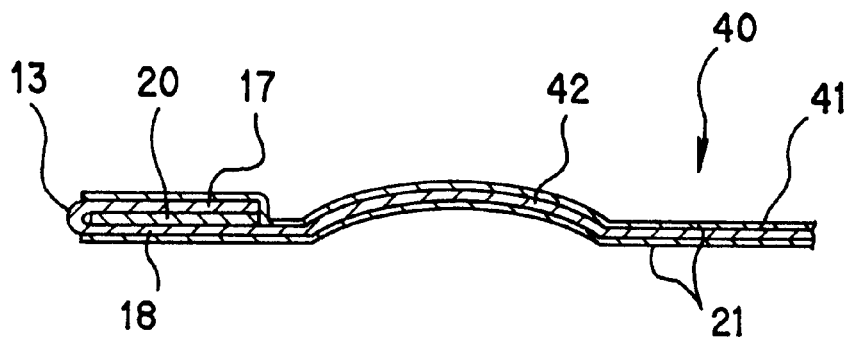
FIG. 10 is a diagram equivalent to FIG. 4 showing a gasket of another construction.

[2] A modified metal gasket 40, shown in FIG. 10, has the beaded plate 41 (corresponding to the gasket-constituting plate) which is made of the same material as that for the stopper plate 12. In this case the metal gasket 40 may be composed of a single beaded plate 41. The beaded plate 41 has a stopper 17 as in the case of the stopper plate 12. It also has a spacer layer 20 formed between the stopper 17 and the annular pressure receiver 18 opposite thereto. It also has an annular bead 42 which bulges toward the side on which the stopper 17 is formed. The annular bead 42 is formed along the outer periphery of the stopper 17. In this case the inner periphery of the bead 42 in the beaded plate 41 functions as the stepped part 19, which prevents the metal gasket 40 from being deformed when the stopper 17 is formed. As the result, the metal gasket 40 as a whole is kept flat.

Figure 11:
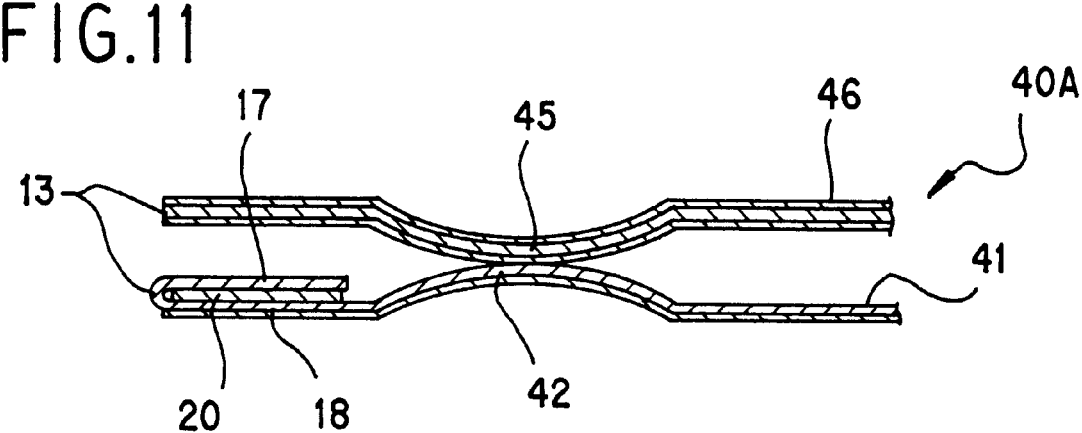
FIG. 11 is a diagram equivalent to FIG. 4 showing a gasket of another construction.
Figure 12:
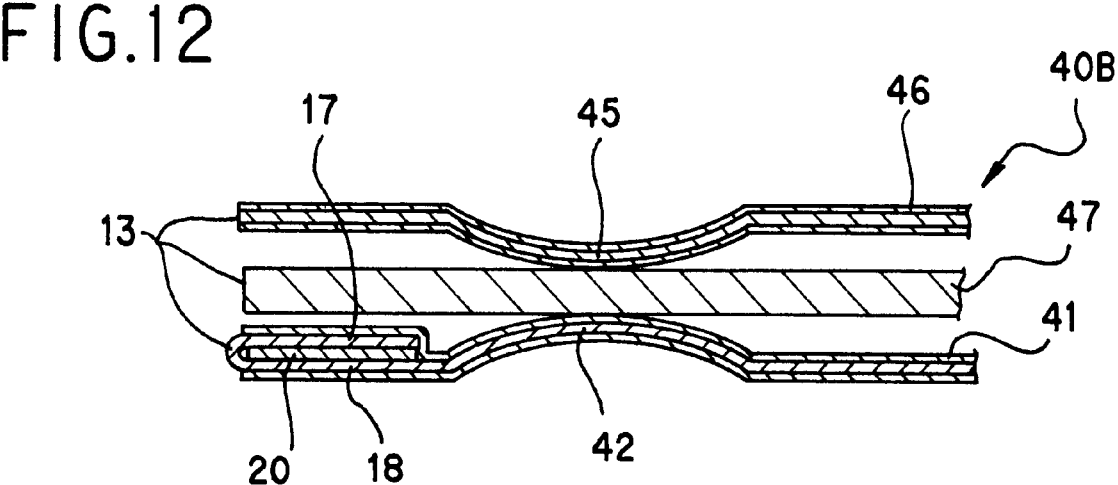
FIG. 12 is a diagram equivalent to FIG. 4 showing a gasket of another construction.
Figure 16:
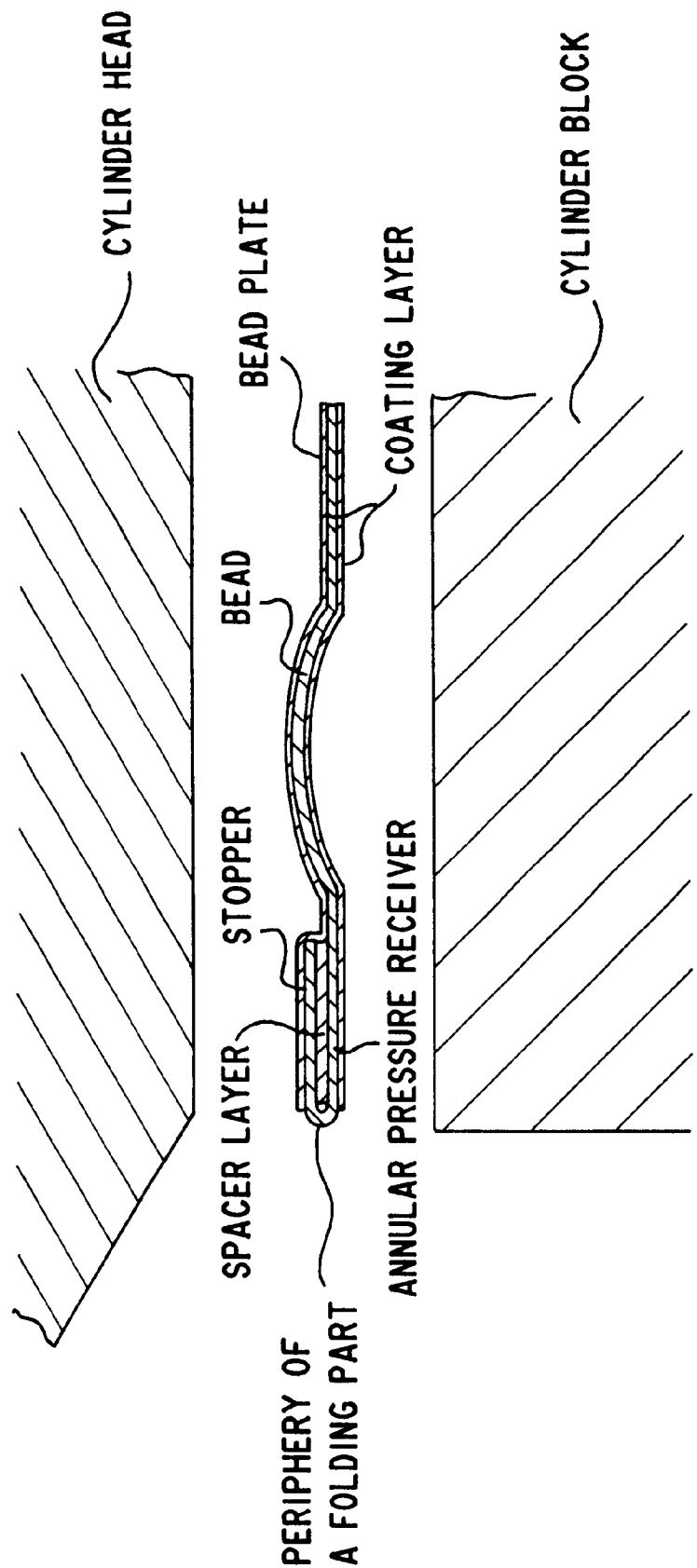
FIG. 16 shows prior art.

[3] A modified metal gasket 40A, shown in FIG. 11, may be composed of the beaded plate 41 and the beaded plate 46 placed on top of the other, with the beads 42, 45 facing each other. Another modified metal gasket 40B, shown in FIG. 12, may have a supporting plate 47 between the two beaded plates 41 and 46. Another modified metal gasket 40C, shown in FIG. 13, may have a supporting plate 48 on the upper side of the beaded plate 41. Incidentally, the beaded plate 46 and the supporting plate 48 may be made of the same material as that for the stopper plate 12.

[4] A modified metal gasket 40D, shown in FIG. 14, has a supporting plate 48. The supporting plate 48 has an opening 13, whose diameter is equal to that of the opening of the stopper 17 of the beaded plate 41A. In this case, the space S (communicating with the combustion chamber 7) between the cylinder head 4 and the cylinder block 1 should be as small as possible, so as to minimize the amount of HC exhaust gas from the engine. The thickness of the spacer layer 20 should be 0.016–0.186 mm so as to reduce the radius of curvature of the folded part. This effectively protects the folded part from cracking. Incidentally, the same structure as in the metal gasket 40D may be applied to the metal gaskets 10, 10A–10E, 40A–40C to produce the same effect. That: is, the diameter of the opening of the stopper 17 is equal to that of the opening of the supporting plate and the beaded plate.

[5] A modified metal gasket 51, shown in FIG. 15, is composed of a single beaded plate 50 (which corresponds to the gasket-constituting plate). The beaded plate 50 has a stopper 17 which is extended outward such that its outer periphery touches the inner periphery of the bead 42. Incidentally, the beaded plate 50 may be used to construct the metal gaskets 40 and 40A–40D. The beaded plate, stopper plate and supporting plate constituting the metal gasket may be made of precipitation hardened stainless steel, such as SUS304, SUS630, and SUS631 (specified in JIS), in addition to the precipitation hardened high-silicon duplex stainless steel. In the case where the stopper plate 12 arid the beaded plates 41, 41D, and 50 are made of SUS304, it is desirable to increase their thickness slightly (say, 0.08–0.12 mm) so that the folded part of the stopper 17 will not suffer microcracking.

The metal gasket may have the beaded plate, stopper plate, and supporting plate arranged in the different order than that illustrated above. The number and thickness of the plates may be properly established. The coating layer 21 will be sufficient if it is formed on at least one of the upper and lower surfaces of the metal gasket or at least one of the opposing surfaces of the adjacent beaded plate, stopper plate, and supporting plate constituting the metal gasket.

In this example, the present invention was applied to the metal gaskets 10 to be placed between the cylinder block 1 and the cylinder head 4 of a V-6 engine. The present invention may also be applied to the metal gasket for other engines such as V-type multiple-cylinder engines, single-cylinder engines, and straight multiple-cylinder engines. It may also be applied to the metal gasket for any compressor and air pump having a cylinder block and a cylinder head.

[Effect of the Invention]

The metal gasket pertaining to the present invention is constructed such that a stepped part is formed along the outer periphery of the stopper formed in one of the gasket-constituting plate. This simple structure remarkably prevents the gasket-constituting plate from being deformed as a whole. The freedom from deformation facilitates the assembling of the multi-plate metal gasket and the installation of the metal gasket in the engine. The freedom from deformation also permits the single-plate metal gasket to be readily installed on an engine.

The metal gasket may have the bead formed along the outer periphery of the stopper in the gasket-constituting plate. This structure makes the single-plate gasket resistant to deformation even though the metal gasket does not have the stepped part.

The metal gasket may be formed from the above-mentioned material so that it is thin and yet superior in toughness, heat resistance, and durability.

The metal gasket has a coating layer on the gasket-constituting plate. This coating layer greatly improves the metal gasket in sealing performance. In addition, the gasket-constituting plate less liable to deformation permits the rubber coating layer to be formed thereon uniformly in thickness. This contributes to the sealing performance of the metal gasket.

The metal gasket may have a spacer layer between the stopper and the gasket-constituting plate opposite to the stopper. This spacer layer reduces the radius of curvature of the folded part of the stopper and hence protects the folded part from cracking. This contributes to the durability of the metals gasket and prevents the spacer layer from peeling. The spacer layer of adequate thickness improves the sealing performance between the cylinder head and the cylinder block and between the piston and the cylinder bore. This in turn contributes to the engine performance.

The spacer layer is formed by pattern printing. The pattern printing makes it possible to properly adjust the thickness of the spacer layer, to form a plurality of spacer layers simultaneously, and to form the spacer layer only at a desired part. Therefore, it makes it greatly easy to form the spacer layer.

The metal gasket is constructed such that the inner periphery of the folded part of the stopper in the gasket-constituting plate in which the stopper is formed is placed inside the inner periphery of the opening of the gasket-constituting plate in which the stopper is not formed. This structure makes it possible to form a gap (corresponding to the thickness of the gasket-constituting plate in which the stopper is not formed) at that part opposite to the folded part of the stopper. This reduces the load exerted on the folded part, and hence effectively protects the folded part from cracking.

The metal gasket is constructed such that the diameter of the inner periphery of the folded part of the stopper of the gasket-constituting plate in which the stopper is formed is equal to that of the inner periphery of the opening of the gasket-constituting plate in which the stopper is not formed. This minimizes the space (communicating with the combustion chamber) between the cylinder head and the cylinder block. And this reduces the amount of HC exhaust gas from the engine.

If the metal gasket is constructed using spacer material having an adhesive property, the stopper and the annular pressure receiver can be considered to be attached through the spacer layer. This feature reduces stress acting on the periphery of the folding part and hance effectively protects the folding part from cracking.

EXPLANATION OF SIGNS

| | Explanation of signs | | |
|---|---|---|---|
| 1 | Cylinder block | 1A | Bank |
| 1B | Bank | 2 | Cylinder hole |
| 3 | Bolt hole | 4 | Cylinder head |
| 5 | Piston | 6 | Piston ring |
| 7 | Combustion chamber | 10 | Metal gasket |
| 11 | Beaded plate | 12 | Stopper plate |
| 13 | Opening | 14 | Bolt passing hole |
| 15 | Annular Bead | 16 | Extending part |
| 17 | Stopper | 18 | Annular pressure receiver |
| 19 | Stepped part | 20 | Spacer layer |
| 21 | Rubber coating layer | 30 | Supporting plate |
| 10A | Metal gasket | 31 | Supporting plate |
| 10B | Metal gasket | 33 | Supporting plate |
| 32 | Supporting plate | 41 | Beaded plate |
| 10C | Metal gasket | 45 | Bead |
| 10D | Metal gasket | | |
| 10E | Metal gasket | | |
| 40 | Metal gasket | | |
| 42 | Bead | | |
| 40A | Metal gasket | | |

What is claimed is:

1. A metal gasket comprising at least a first gasket-constituting plate composed of an elastic metal plate having an opening corresponding to the cylinder hole of the engine, said gasket constituting plate including:

an annular stopper formed by folding back the peripheral portion of said first gasket-constituting plate on an annular pressure receiver portion of said first gasket-constituting plate around the periphery of said opening, and an annular bead formed in said first gasket-constituting plate along the outer periphery of the stopper, said bead projecting toward the side of said first gasket-constituting plate on which the stopper is formed, wherein an inner periphery of said bead functions as a stepped part to prevent an overall deformation of said first gasket-constituting plate, wherein a raised spacer layer is formed by pattern printing with a heat-resistant, compression-resistant material between said stopper and said annular pressure receiver portion of said gasket-constituting plate opposite said stopper, and wherein said heat-resistant compression-resistant material adheres to said first gasket-constituting plate.

2. A metal gasket as defined in claim 1, further comprising a second gasket-constituting plate arranged facing said bead of said first gasket-constituting plate, said second gasket-constituting plate having no stopper formed thereon, said plates being arranged such that the inner periphery of the folded part of the stopper of the first gasket-constituting plate is inside the inner periphery of the opening of the second gasket-constituting plate.

3. A metal gasket as defined in claim 1, further comprising a second gasket-constituting plate arranged facing said bead of said first gasket-constituting plate, said second gasket-constituting plate having no stopper formed thereon, the inner periphery of the folded part of the stopper of the first gasket-constituting plate having the same radius as that of the inner periphery of the opening of the second gasket-constituting plate.

4. A metal gasket as defined in claim 1, wherein said first gasket-constituting plate is formed from precipitation hardened high-silicon duplex stainless steel by fabrication into a desired shape and age hardening, said stainless steel being composed of, by weight, no more than 0.05% carbon, 3–6% silicon, no more than 5% manganese, 5–10% nickel, 6–12% (excluding 12%) chromium, 0.2–1% molybdenum, and 0.5–3% copper, with the remainder being iron.

5. A metal gasket as defined in claim 1, wherein said spacer layer comprises an aluminum powder and epoxy resin.

* * * * *